(12) United States Patent
Yang

(10) Patent No.: US 9,329,754 B2
(45) Date of Patent: May 3, 2016

(54) METHOD FOR OPERATING MENU OF MULTIMEDIA DISK

(75) Inventor: Ming-Fon Yang, Taipei (TW)

(73) Assignee: Corel Corporation, Ottawa (CA)

( * ) Notice: Subject to any disclaimer, the term of this patent is extended or adjusted under 35 U.S.C. 154(b) by 2012 days.

(21) Appl. No.: 11/834,695

(22) Filed: Aug. 7, 2007

(65) Prior Publication Data

US 2009/0007024 A1  Jan. 1, 2009

(30) Foreign Application Priority Data

Jun. 28, 2007  (CN) .............................. 200710127482

(51) Int. Cl.
*G06F 3/048* (2013.01)
*G06F 3/0482* (2013.01)
*G06F 17/30* (2006.01)

(52) U.S. Cl.
CPC ........ *G06F 3/0482* (2013.01); *G06F 17/30017* (2013.01)

(58) Field of Classification Search
USPC .................................................. 345/156–173
See application file for complete search history.

(56) References Cited

U.S. PATENT DOCUMENTS

| | | | | |
|---|---|---|---|---|
| 4,587,520 A | * | 5/1986 | Astle .............................. | 345/160 |
| 4,698,625 A | * | 10/1987 | McCaskill et al. ............ | 345/157 |
| 5,598,183 A | * | 1/1997 | Robertson et al. ............ | 715/856 |
| 5,850,212 A | * | 12/1998 | Nishibori ...................... | 345/160 |
| 6,323,884 B1 | * | 11/2001 | Bird et al. ...................... | 715/810 |
| 2002/0075333 A1 | * | 6/2002 | Dutta et al. ................... | 345/862 |
| 2005/0091692 A1 | | 4/2005 | Paz et al. | |
| 2005/0091695 A1 | | 4/2005 | Paz et al. | |
| 2005/0122314 A1 | * | 6/2005 | Chen et al. .................... | 345/169 |
| 2005/0235209 A1 | * | 10/2005 | Morita et al. ................. | 715/716 |
| 2006/0184982 A1 | | 8/2006 | Paz et al. | |
| 2006/0232551 A1 | * | 10/2006 | Matta ............................. | 345/156 |
| 2006/0274038 A1 | * | 12/2006 | Redkov et al. ............... | 345/157 |
| 2008/0022219 A1 | * | 1/2008 | Tsai et al. ..................... | 715/769 |

FOREIGN PATENT DOCUMENTS

| | | |
|---|---|---|
| EP | 1511040 | 3/2005 |
| WO | 03100573 | 12/2003 |

* cited by examiner

*Primary Examiner* — Carolyn R Edwards
(74) *Attorney, Agent, or Firm* — Rosenberg, Klein & Lee

(57) ABSTRACT

A method for operating a menu of a multimedia disk is provided. The method includes first selecting an item in the menu as a focus point and using a cursor controller for moving a cursor in the menu. An input event issued by the cursor controller is then translated into an input event of a key on a keyboard based on a relative position between the cursor and the focus point, so as to shift or select a target title. Consequently, a user can operate the menu of the multimedia disk in a computer system by using the cursor controller, and the convenience of operating the menu can be improved.

21 Claims, 4 Drawing Sheets

say, the user is not able to operate the menu of the HD DVD by means of the mouse, resulting in inconvenience to the user.

METHOD FOR OPERATING MENU OF MULTIMEDIA DISK

CROSS-REFERENCE TO RELATED APPLICATION

This application claims the priority benefit of China application serial no. 200710127482.7, filed Jun. 28, 2007. All disclosure of the China application is incorporated herein by reference.

BACKGROUND OF THE INVENTION

1. Field of the Invention

The present invention relates to a method for operating a menu, and more particularly to a method for operating a menu of a multimedia disk on a computer system.

2. Description of Related Art

As computer technology advances, the most common computer systems are not only equipped with functions including word processing, data storage and internet connection, but also able to play audio-visual files due to the fact that manufacturers of the computer systems are dedicated to integrating multimedia applications into the computer systems.

The audio-visual files are usually stored in disk storage media including compact disks (CDs), video CDs (VCDs) and digital video disks (DVDs) to better store and retrieve said files which can be played by DVD players. Aside from the above, a user may employ an optical disk drive of a computer to read optical disks and to play the audio-visual files on the computer directly by means of multimedia playback software.

A method for operating the DVD player greatly differs from that for operating the optical disk drive because the DVD player and the optical disk drive support different software and hardware. To play the optical disks on the DVD player, the user may press keys on a remote controller to play, fast-forward, or pause the audio-visual files. Likewise, the keys on the remote controller can be used to shift or select items on a disk menu. On the other hand, as the user plays the optical disks via the computer system, a mouse may be adopted for said operation. Through a playback interface provided by the multimedia playback software, the audio-visual files saved in the optical disks are able to be played. Since no standard of operating the mouse is determined in the DVD specification, the manufacturers of the DVDs are able to define actions corresponding to the operation of the mouse by themselves when the DVDs are fabricated. Thereby, the user can operate the menu by using the mouse as the DVDs are played on the computer.

However, with the progress of blue-ray technology, a high-definition (HD) DVD has been used to store data. The difference between the DVDs and the HD DVDs lies in that definitions associated with the operation of the mouse have been given in the specification of the HD DVDs. Thus, in order for the user to play the HD DVDs with use of the mouse, a set of actions for operating the mouse has to be defined based on the disk menu and burned in the optical disks. However, defining the set of the actions to operate the mouse for each optical disk raises the software designing costs. Moreover, if the manufacturers of the HD DVDs do not configure any action for operating the mouse, the actions of operating the mouse cannot be identified by the programs of playing the files when the user intends to play the HD DVDs on the computer. That is to say, the user is not able to operate the menu of the HD DVD by means of the mouse, resulting in inconvenience to the user.

SUMMARY OF THE INVENTION

In view of the foregoing, the present invention is directed to a method for operating a menu of a multimedia disk. In this method, an item in the menu is shifted or selected based on a relative position between a cursor of a cursor controller and a focus point in the menu.

The present invention provides a method for operating a menu of a multimedia disk. The method is used to operate the menu of the multimedia disk with use of a cursor controller when the multimedia disk is played, and the menu includes a plurality of items. The method includes first selecting one of the items as a target title and configuring the position of the target title in the menu as a focus point. Next, a movement of the cursor controller is detected, and thereby a cursor in the menu is moved. After an input event issued by the cursor controller is received, the target title is then shifted or selected based on a relative position between the cursor and the focus point in the menu.

According to an embodiment of the present invention, the step of shifting or selecting the target title based on the relative position between the cursor and the focus point in the menu includes translating the input event issued by the cursor controller into an input event of a key on a keyboard based on the relative position between the cursor and the focus point in the menu. In addition, the target title is shifted or selected based on the input event of the key on the keyboard.

According to an embodiment of the present invention, the key on the keyboard includes either a direction key or an input key. The direction key includes an up key, a down key, a left key and a right key.

According to an embodiment of the present invention, in the step of shifting or selecting the target title based on the input event of the key on the keyboard, the target title is shifted based on a definition of the direction key when the translated input event of the key on the keyboard is an input event of the direction key. By contrast, the target title is selected when the translated input event of the key on the keyboard is an input event of the input key.

According to an embodiment of the present invention, in the step of translating the input event issued by the cursor controller into the input event of the key on the keyboard based on the relative position between the cursor and the focus point, the input event issued by the cursor controller is translated into an input event of the up key when the cursor controlled by the cursor controller is positioned above the focus point. When the cursor controlled by the cursor controller is positioned below the focus point, the input event issued by the cursor controller is translated into an input event of the down key. When the cursor controlled by the cursor controller is positioned on the left of the focus point, the input event issued by the cursor controller is translated into an input event of the left key. When the cursor controlled by the cursor controller is positioned on the right of the focus point, the input event issued by the cursor controller is translated into an input event of the right key. Moreover, when the cursor controlled by the cursor controller overlaps the focus point, the input event issued by the cursor controller is translated into the input event of the input key.

According to an embodiment of the present invention, after the target title is shifted, the method further includes setting the focus point as the position of the shifted target title in the menu, detecting the movement of the cursor controller repeatedly, receiving the input event issued by the cursor controller, and shifting or selecting the target title based on the relative position between the cursor and the focus point in the menu.

According to an embodiment of the present invention, the input event issued by the cursor controller includes clicking, double clicking, and holding one of input keys of the cursor controller.

According to an embodiment of the present invention, the multimedia disk includes an HD DVD, while the cursor controller includes a mouse, a joystick, a stylus, or a touch-pad.

Through comparing the relative position between the focus point and the cursor corresponding to the cursor controller, the input event issued by the cursor controller is then translated into the input event of the corresponding key on the keyboard, so as to shift or select the target title.

In order to make the aforementioned and other objects, features and advantages of the present invention more comprehensible, several embodiments accompanied with figures are described in detail below.

DESCRIPTION OF EMBODIMENTS

Most users of computer systems have been accustomed to operating software by using a cursor controller, such as a mouse, a touch-pad, and so forth. Hence, it is more convenient for the users to play multimedia disks on the computers if the mouse can be employed to operate a menu of the multimedia disk. Based on the above, the present invention is directed to a method for operating a menu of a multimedia disk. In order to make the present invention more comprehensible, embodiments are described below as the examples to prove that the invention can actually be realized.

Figure 1:
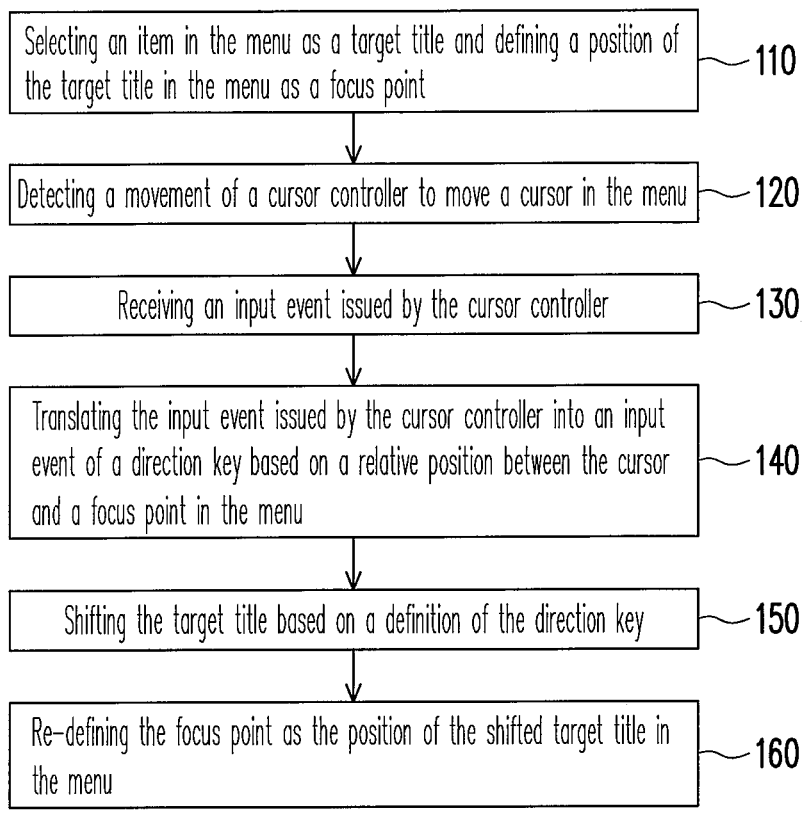
FIG. 1 is a flowchart illustrating a method for operating a menu of a multimedia disk according to an embodiment of the present invention.

FIG. 1 is a flowchart illustrating a method for operating a menu of a multimedia disk according to an embodiment of the present invention. In the present embodiment, the steps of operating the menu of the multimedia disk by using a cursor controller of a computer are elaborated. Here, the multimedia disk includes but is not limited to, for example, an HD DVD, whereas the cursor controller may be a computer peripheral device, such as a mouse, a joystick, a stylus, or a touch-pad, which is not restricted in the present invention.

Referring to FIG. 1, as the user plays the multimedia disk through the computer system, the menu of the multimedia disk appears on a screen of the computer for the user to operate. As shown in step 110, an item in the menu is predetermined as a target title, and the position of the target title in the menu is defined as a focus point. In the present embodiment, the target title is highlighted in the menu, for example, such that the user can be reminded of the position of the target title.

Next, as indicated in step 120, a movement of the cursor controller is detected when the user moves the cursor controller, and thereby a cursor in the menu is moved. After that, in step 130, an input event issued by the cursor controller is received. Here, the input event of the cursor controller includes, for example, clicking, double-clicking, or holding an input key of the cursor controller. For illustrative purposes, the mouse is taken as the cursor controller in the following embodiment, and the input event thereof lies in clicking a left key of the mouse.

After receipt of the input event issued by the cursor controller, the input event issued by the cursor controller is translated into an input event of a key on a keyboard based on a relative position between the cursor and a focus point in the menu, as indicated in step 140. For example, the key refers to a direction key, such as an up key, a down key, a left key, or a right key.

Figure 2:
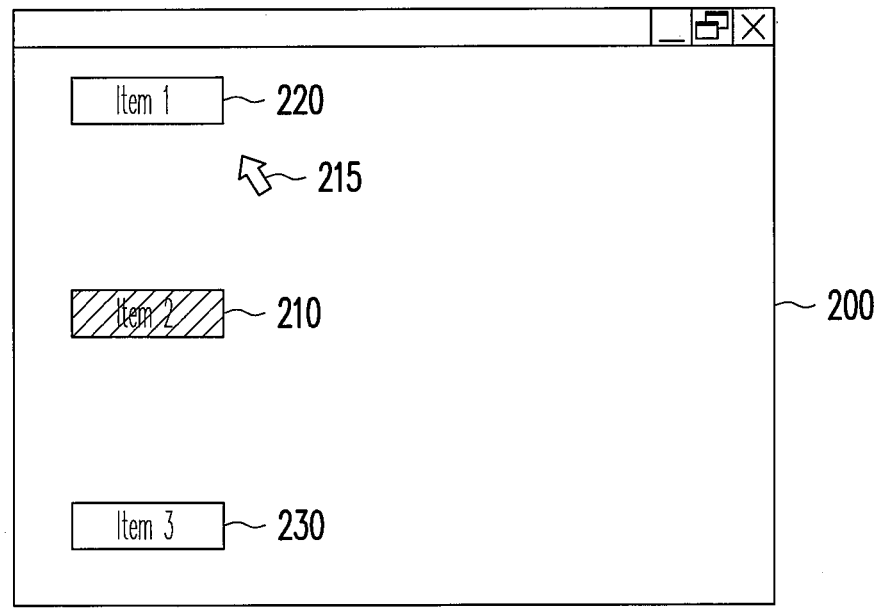
FIG. 2 is a schematic view illustrating a menu of a multimedia disk according to an embodiment of the present invention.

As shown in FIG. 2, for example, given that the target title in a menu 200 of the multimedia disk is predetermined as an item 210, the position of the item 210 in the menu 200 is then defined as the focus point. When the user moves a cursor 215 above the item 210 with use of the mouse and triggers an input event of the mouse, the input event is then translated into an input event of the up key.

Figure 3:
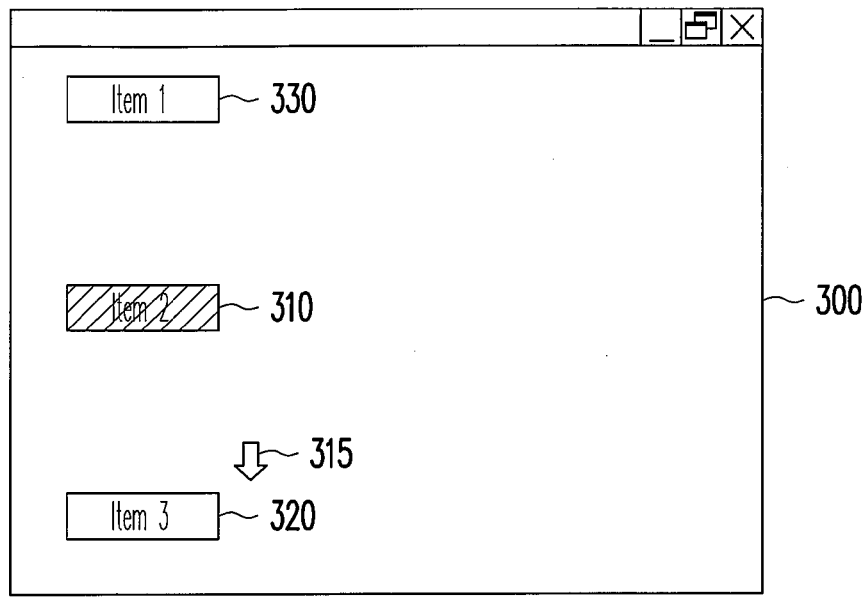
FIG. 3 is a schematic view illustrating a menu of a multimedia disk according to an embodiment of the present invention.

However, as shown in FIG. 3, suppose that the target title in a menu 300 of the multimedia disk is predetermined as an item 310, the position of the item 310 in the menu 300 is then defined as the focus point. When the user moves a cursor 315 below the item 310 with use of the mouse and triggers the input event of the mouse, the input event is then translated into an input event of the down key.

Figure 4:
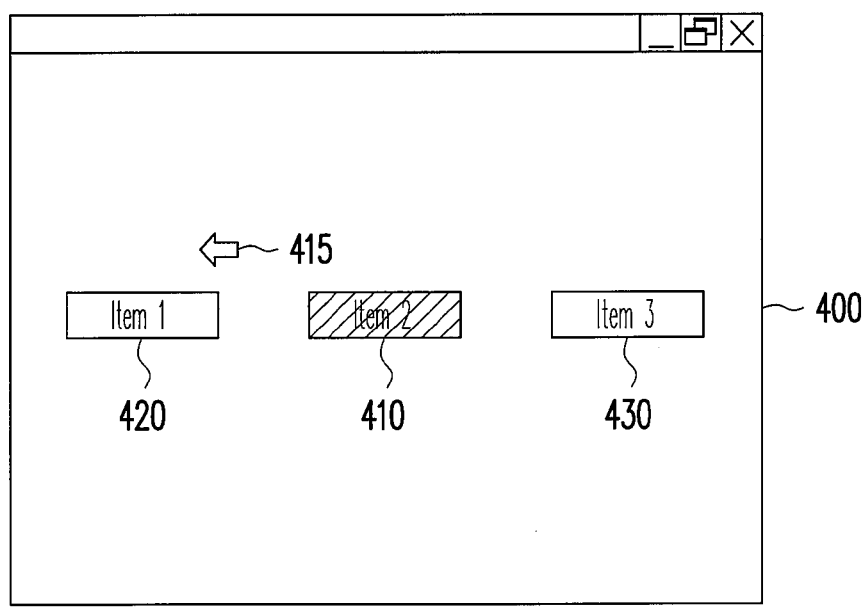
FIG. 4 is a schematic view illustrating a menu of a multimedia disk according to an embodiment of the present invention.

Besides, as shown in FIG. 4, if the target title in a menu 400 of the multimedia disk is predetermined as an item 410, the position of the item 410 in the menu 400 is then defined as the focus point. When the user moves a cursor 415 to the left of the item 410 with use of the mouse and triggers the input event of the mouse, the input event is then translated into an input event of the left key.

Figure 5:
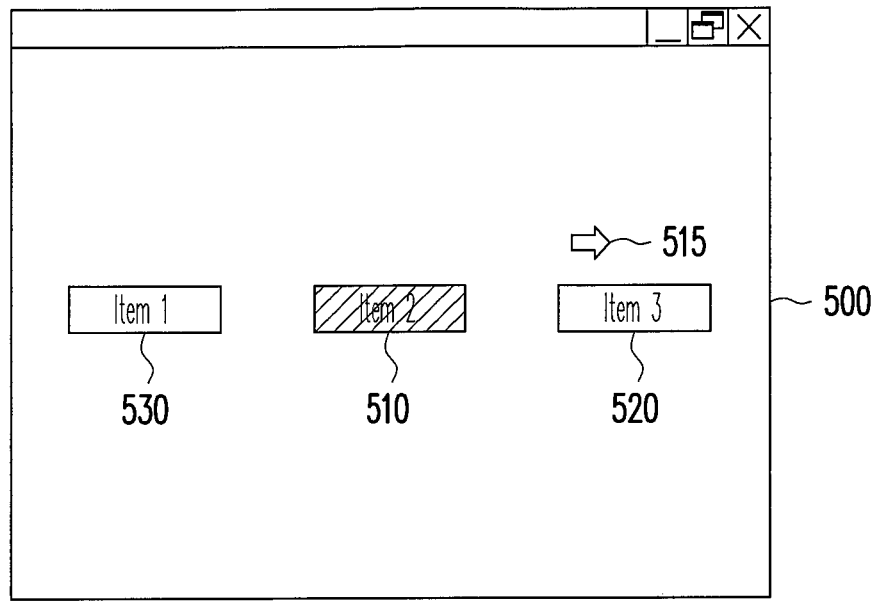
FIG. 5 is a schematic view illustrating a menu of a multimedia disk according to an embodiment of the present invention.

Likewise, as indicated in FIG. 5, if the target title in a menu 500 of the multimedia disk is predetermined as an item 510, the position of the item 510 in the menu 500 is then defined as the focus point. Accordingly, when the user moves a cursor 515 to the right of the item 510 with use of the mouse and triggers the input event of the mouse, the input event is then translated into an input event of the right key.

Thereafter, referring to step 150 in FIG. 1, after the aforesaid input event is translated, the target title is shifted based on a definition of the direction key, given that the input event of the key on the keyboard is corresponding to the input event of the direction key as stated in the above embodiment. Moreover, as illustrated in step 160, the focus point is re-defined as the position of the shifted target title in the menu.

In more detail, after the steps 150 and 160 are finished, the target title in the menu 200 of the multimedia disk depicted in FIG. 2 is shifted from the item 210 to another item 220. Besides, the position of the focus point is re-defined as the position of the item 220 in the menu 200 of the multimedia disk. In the embodiment correspondingly illustrated in FIG.

3, the target title is shifted from the item 310 to another item 320, and the position of the focus point is also re-defined as the position of the item 320 in the menu 300 of the multimedia disk. Furthermore, the target title corresponding to the menu 400 and that corresponding to the menu 500 are respectively shifted from the items 410 and 510 to items 420 and 520. The positions of the focus points are also re-defined as positions of the items 420 and 520 in the menus 400 and 500 of the multimedia disks, respectively.

The user is able to repeat each of the steps illustrated in FIG. 1, such that the target title can be shifted by translating the input event of the cursor controller into the input event of the direction key.

Figure 6:
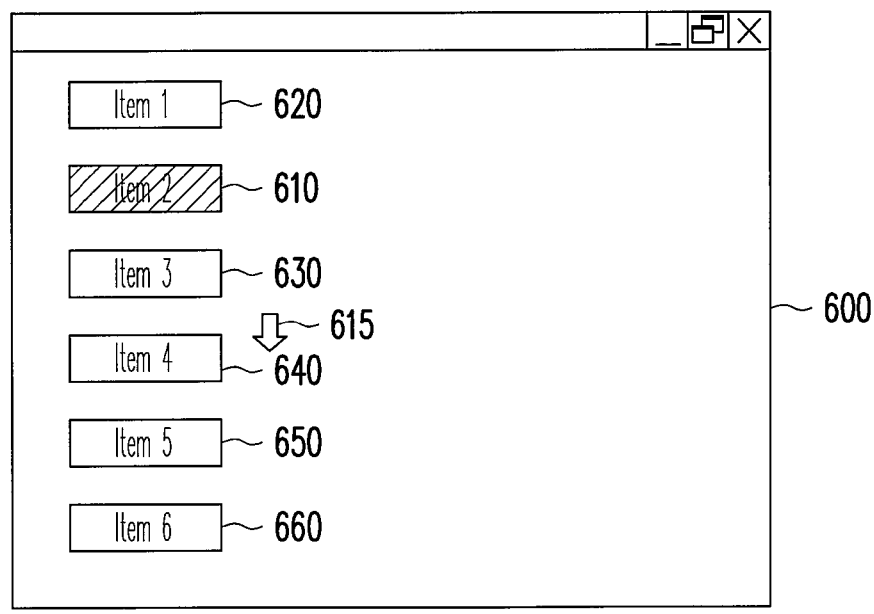
FIG. 6 is a schematic view illustrating a menu of a multimedia disk according to an embodiment of the present invention.

Notably, as shown in FIG. 6, the target title is defined as an item 610 in a menu 600 of the multimedia disk. As the cursor is moved below the item 610, and the input event is generated by double-clicking the input key of the mouse, the target title is shifted downward for two times continuously, for example, and the item 610 is then changed to an item 640. Nevertheless, given that the user holds the input key of the mouse to generate the input event, the target title originally defined as the item 610 keeps on being shifted in a descending manner until the user stops holding the input key of the mouse, and at the time, the item to which the target title is shifted is defined as a new target title. In the present embodiment, the cursor corresponding to the mouse is moved below the target title, for example, which is not limited in the present invention. In other words, as the cursor is moved to the top, the left, or the right of the target title, the target title is also shifted in a direction defined by the direction key based on the translated input event thereof.

Figure 7:
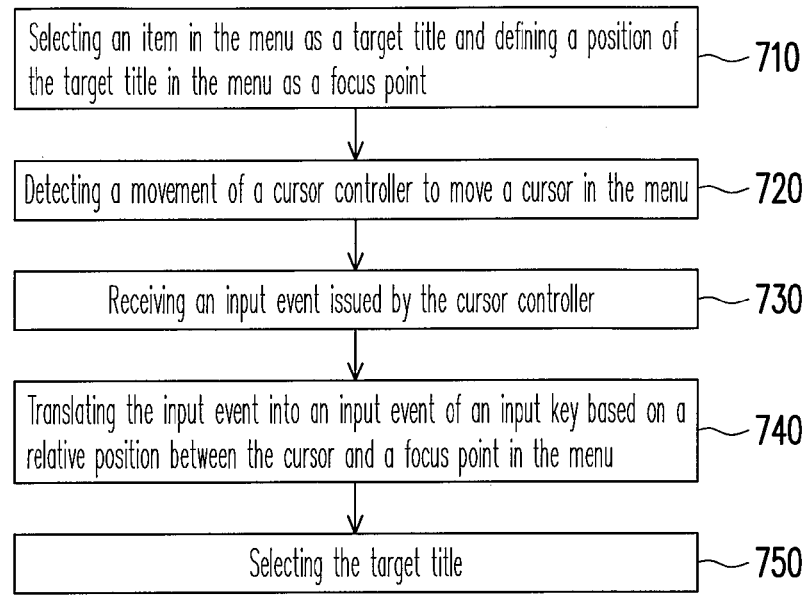
FIG. 7 is a flowchart illustrating a method for operating a menu of a multimedia disk according to another embodiment of the present invention.

FIG. 7 is a flowchart illustrating a method for operating a menu of a multimedia disk according to another embodiment of the present invention. Referring to FIG. 7, in steps 710~730, a movement of the cursor controller and a process of obtaining the input event of the cursor controller are demonstrated. Since the steps 710~730 are identical or similar to the steps 110~130 illustrated in the previous embodiment, no further description is provided herein. Instead, the detailed steps of operating the menu are further provided as follows when the translated input event of the key on the keyboard is an input event of the input key.

Figure 8:
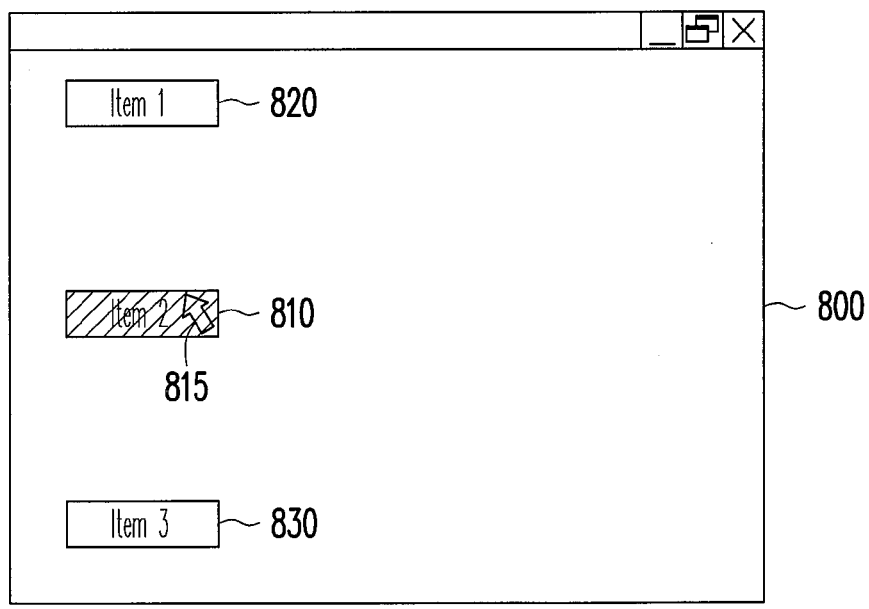
FIG. 8 is a schematic view illustrating a menu of a multimedia disk according to an embodiment of the present invention.

With reference to FIGS. 7 and 8, the input event is translated based on the relative position of the cursor and the focus point, as shown in step 740. For example, suppose that the target title in a menu 800 of the multimedia disk is an item 810, the input event of the cursor controller is translated into the input event of the input key when a cursor 815 overlaps the focus point (i.e. the position of the item 810 in the menu 800 of the multimedia disk).

Thereafter, as indicated in step 750, the current target title (i.e. the item 810) is selected to perform an action corresponding to the item 810, such as playing video files in the multimedia disk, displaying the menu on the next page, and so forth.

To sum up, according to the method for operating the menu of the multimedia disk in the present invention, the input event issued by the cursor controller is translated into the input event of the key on the keyboard based on the relative position between the cursor and the focus point in the menu, so as to shift or select the target title. Thereby, it is rather convenient for the user to operate the menu of the multimedia disk by means of the cursor controller on the computer system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for operating a menu of a multimedia disk with use of a cursor controller, wherein the menu comprises a plurality of menu items, the method comprising:
 a) selecting one of the menu items as a current target title and configuring a position of the target title in the menu as a focus point while the multimedia disk is being operated by a disk playing device in communication with the cursor controller;
 b) detecting a movement of the cursor controller and moving a cursor in the menu in a direction associated with the detected movement of the cursor controller;
 c) receiving an input event issued by the cursor controller;
 d) upon receipt of the input event, identifying and selecting another menu item to which the target title is shifted, by determining that the another menu item lies in one of a set of predetermined directions of movement associated with the current position of the cursor with respect to the currently configured focus point in the menu when the cursor is positioned at a location other than on a menu item; and
 e) reconfiguring the focus point as the position of the newly identified menu item to which the target title is shifted, when the cursor is on the newly identified menu item.

2. The method according to claim 1, wherein the set of predetermined directions of movement respectively correspond to a set of direction keys on a keyboard, and wherein step d comprises:
 translating a first portion of the input event issued by the cursor controller into an input event of an identified one of the direction keys on the keyboard based on the determined direction of movement; and
 translating a second portion of the input event issued by the cursor controller into an input event instruction of a predetermined input key on the keyboard when the cursor is on the newly identified menu item to which the target title is shifted.

3. The method according to claim 1, wherein the current position relates to a region between the current target title and other items in the menu in the direction of motion of the cursor.

4. The method according to claim 1, wherein the step d further comprises:
 continuing to shift the target title to a subsequent item in the menu in the same direction of motion of the cursor when the cursor is positioned at a location other than on any menu item upon either receiving another input event issued by the cursor controller or not receiving the second portion of the input event already issued by the cursor controller.

5. The method according to claim 1, wherein the input event issued by the cursor controller comprises clicking, double clicking, and holding one of input keys of the cursor controller.

6. The method according to claim 1, wherein the cursor controller comprises at least one of a mouse, a joystick, a stylus, a touch-pad, a foot-pad, a foot-pedal, and a game controller with motion detection.

7. The method according to claim 1, wherein selecting one of the menu items as a target title comprises identifying that the cursor overlaps a predetermined region of a display displaying the menu of the multimedia disk for a predetermined period of time.

8. A method comprising:
(a) displaying a menu comprising a plurality of items relating to a multimedia disk to a user on a display coupled to a disk playing device, when the disk playing device operates the multimedia disk;
(b) detecting a movement of a cursor controller in communication with the disk playing device;
(c) moving a cursor associated with the cursor controller on the display towards an item of the menu in response to a detected direction of movement of the cursor relative to a currently configured focus point in the menu when the cursor is positioned at a location other than on a menu item, and establishing the item of the menu as a new focus point, the new focus point being in the detected direction of movement of the cursor;
(d) detecting whether the cursor is dwelling within a first predetermined portion of the display associated with a graphic representation of the item of the menu for a first predetermined period of time; and
(e) selecting the item of the menu as a target title.

9. The method according to claim 8, wherein, step (e) further comprises executing a command associated with the selected item.

10. The method according to claim 8, further comprising;
f) detecting subsequent movement of the cursor controller and moving the cursor in the menu;
g) receiving an input event; and
h) performing an action based on a relative position of the cursor at the time of receipt of the input event with respect to the previous location of the cursor when selecting the item in step (e).

11. The method according to claim 10, wherein receipt of the input event comprises detecting the cursor as being within a second predetermined portion of the display associated with a graphic representation of another item of the menu for a second predetermined period of time.

12. The method according to claim 8 wherein, step (e) comprises changing the displayed menu to the user by performing one or both of: placing the selected item in a predetermined portion of the display, and, changing an aspect of the graphic representation of the selected item to the user.

13. The method according to claim 10, wherein the relative position relates to the region between the current target title and other items in the menu in the direction of motion of the cursor.

14. The method according to claim 10, wherein the method further comprises:
continuing to shift the target title to a subsequent item in the menu in the same direction of motion of the cursor when the cursor is positioned at a location other than on any menu item upon either receiving another input event issued by the cursor controller or not receiving a portion of the input event already issued by the cursor controller.

15. The method according to claim 10, wherein the input event is issued by the cursor controller, and the input event comprises clicking, double clicking, and holding one of input keys of the cursor controller.

16. The method according to claim 8, wherein the cursor controller comprises at least one of a mouse, a joystick, a stylus, a touch-pad, a foot-pad, a foot-pedal, and a game controller with motion detection.

17. The method of claim 1, further comprising:
f) playing back content from the multimedia disk associated with the newly identified menu item in response to the input event.

18. The method of claim 1, wherein the multimedia disk comprises a high-definition digital versatile disk (DVD).

19. The method of claim 18, wherein the DVD does not contain any set of actions configured for operating the menu using a cursor controller.

20. A method of controlling operation of a digital versatile disk (DVD) using a computing device having a cursor controller and display in communication therewith, the DVD containing a plurality of audio-visual files, the audio-visual files having respectively corresponding menu items, the method comprising:
a) displaying a menu comprising the menu items arranged together in the display, the menu items having regions therebetween, wherein the menu item corresponding to a current target one of the plurality of audio-visual files is configured as a focus point of the display;
b) detecting a movement of the cursor controller and moving a cursor in the menu in a direction associated with the detected movement of the cursor controller;
c) determining that a current position of the cursor simultaneously corresponding to the detected movement is in one of the regions between menu items;
d) when the determined current position is in one of the regions between menu items, determining one of a set of predetermined directions of movement associated with the detected cursor controller movement by comparing the current position of the cursor with respect to the current focus point in the menu;
e) identifying another menu item that lies in the determined one of the set of predetermined directions of movement; and
f) changing the current target one of the plurality of audio-visual files to the one audio-visual file corresponding to the another menu item in response to an input even issued by the cursor controller.

21. The method according to claim 20, wherein the set of predetermined directions of movement respectively correspond to a set of direction keys on a keyboard, the method further comprising, before step f):
g) translating the detected cursor controller movement into an input event of an identified one of the direction keys on the keyboard based on the determined direction of movement in response to the input event issued by the cursor controller.

* * * * *